United States Patent [19]
Froeschke

[11] Patent Number: 5,730,329
[45] Date of Patent: Mar. 24, 1998

[54] APPARATUS FOR APPLYING FREE-FLOWING SUBSTANCES AS STRIPS OR DROPS ONTO A TRANSPORT BELT

[75] Inventor: Reinhard Froeschke, Weinstadt, Germany

[73] Assignee: Santrade Ltd., Lucerne, Switzerland

[21] Appl. No.: 596,180

[22] PCT Filed: May 23, 1995

[86] PCT No.: PCT/EP95/01964

§ 371 Date: Mar. 27, 1996

§ 102(e) Date: Mar. 27, 1996

[87] PCT Pub. No.: WO95/33551

PCT Pub. Date: Dec. 14, 1995

[30] Foreign Application Priority Data

Jun. 3, 1994 [DE] Germany .................. 44 19 491.9

[51] Int. Cl.[6] ............................................... B01J 2/20
[52] U.S. Cl. .................. 222/109; 222/424; 222/486; 425/6; 425/225
[58] Field of Search ..................... 222/108, 109, 222/111, 148, 318, 403, 420, 423, 424, 410, 486; 425/6, 8, 225, 229, 230, 382.3, DIG. 230

[56] References Cited

U.S. PATENT DOCUMENTS

| | | |
|---|---|---|
| 4,279,579 | 7/1981 | Froeschke ........................... 425/6 |
| 4,578,021 | 3/1986 | Schermutzki ....................... 425/6 |
| 5,013,498 | 5/1991 | Froeschke ....................... 425/6 X |
| 5,232,128 | 8/1993 | Froeschke ....................... 222/109 |
| 5,344,087 | 9/1994 | Froeschke ........................ 241/91 |
| 5,401,938 | 3/1995 | Froeschke et al. ............. 425/6 X |

*Primary Examiner*—Kevin P. Shaver
*Attorney, Agent, or Firm*—Burns, Doane, Swecker & Mathis, L.L.P.

[57] ABSTRACT

A drop former comprises a drum assembly including a stationary inner drum and a rotatable outer drum mounted coaxially around the inner drum. The outer drum has holes which periodically become aligned with holes in the inner drum to allow a flowable substance to flow from the inner drum onto a cooling belt traveling beneath the outer drum. In order to redirect into the outer drum, residual portions of the substance which have not fallen off the outer drum, a directing device is disposed around a portion of the circumference of the outer drum. The directing device is mounted on a frame which pivots toward and away from the outer drum. In order to secure the directing device to the drum assembly, a ring is mounted on an end of the inner drum which projects beyond a respective end of the outer drum. The ring, which is rotatable and movable axially relative to the inner drum, carries a radial projection which is received in a recess of the frame when the frame is in an operating position. A manually rotatable sleeve carried by the frame can be threadedly secured to the projection.

15 Claims, 4 Drawing Sheets

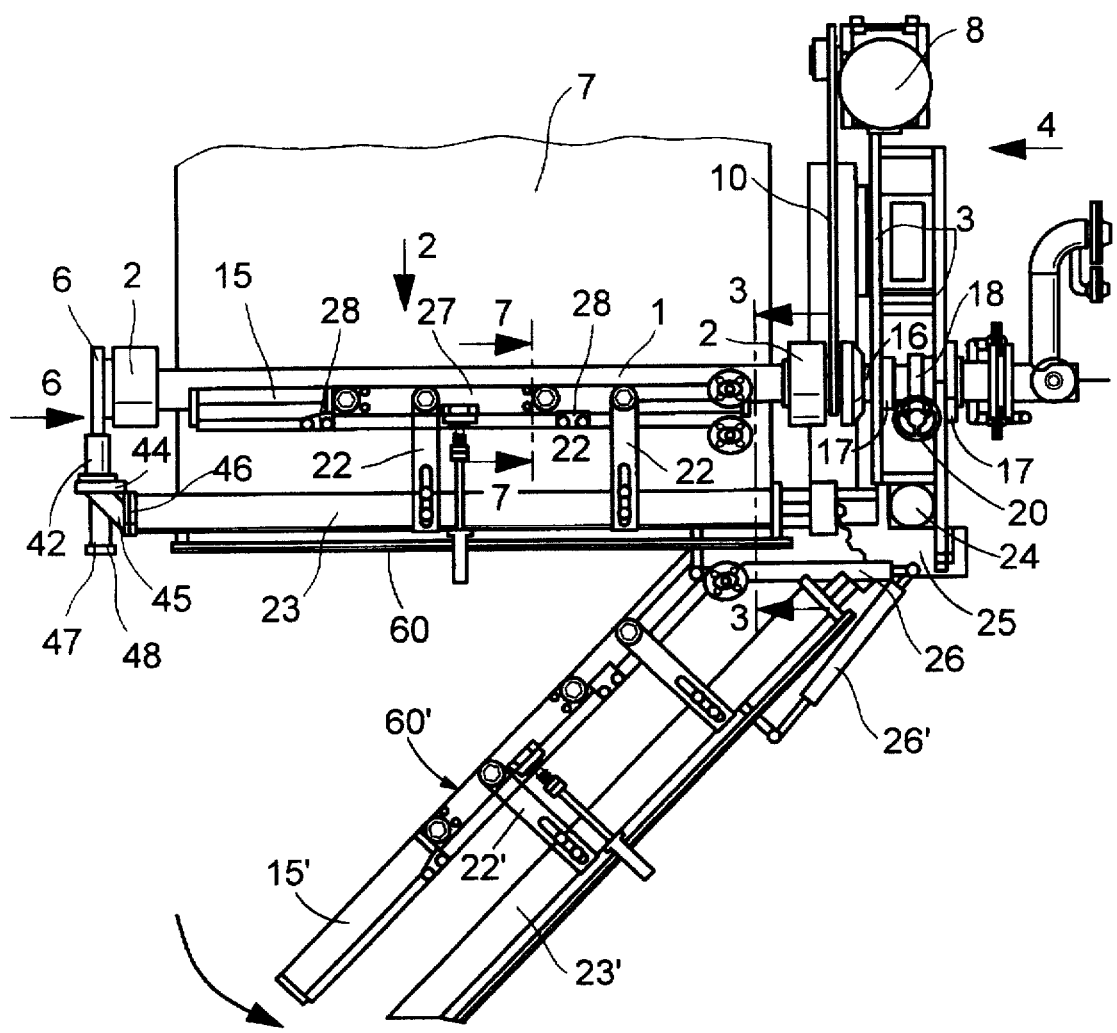
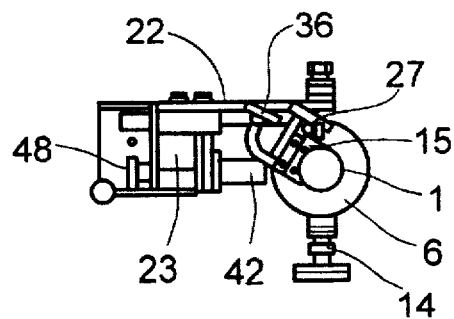

APPARATUS FOR APPLYING FREE-FLOWING SUBSTANCES AS STRIPS OR DROPS ONTO A TRANSPORT BELT

BACKGROUND OF THE INVENTION

The present invention relates to an apparatus for applying free-flowing substances as strips or drops onto a transport belt passing by below.

Conventionally, such an apparatus comprises two drums rotatable relative to one another that are mounted concentrically within one another, a rotatable outer drum being provided with openings which upon rotation, can be cyclically brought into registration with at least one opening of a stationary inner drum, facing the transport belt and corresponding to the width of the transport belt. A device, surrounds in a circumferential region of the outer drum facing away from the transport belt, for substance residues back into the openings. The directing device is arranged so as to pivot about an axis arranged in a pivot mount and standing perpendicular to the axis of the drums to afford access to the outer drum. The directing device pivots from an operating position to a retracted position, away from the periphery of the drum, and in the operating position is secured parallel to the drum axis by a retaining apparatus attaching coaxially onto the stationary drum.

Apparatuses of this kind are known from DE 41 19 021 C1, in which the directing device carries a spur with a tip, that is retained in a corresponding depression in the center of the free end wall of the stationary inner drum, to secure the pivotable directing device in the operating position. With this design the axially displaceable spur must be introduced into the depression associated with it by means of a knurled screw when the directing device retainer needs to be secured; conversely, unscrewing is required when the directing device needs to be pivoted aside for maintenance purposes. This is not only complex but also, since positive fit is achieved only by the engagement of a tip, low-stability immobilization is achieved; and lastly it has also been found that lengthwise expansion of the stationary drum caused by temperatures can lead to bending of the spur retainer, which means that the arrangement of the directing device with respect to the outer drum is no longer parallel.

The underlying object of the invention is therefore, in an apparatus of the aforesaid kind, to provide for stable securing of the directing device retainer that is also insensitive to changes in length.

SUMMARY OF THE INVENTION

To achieve this object, in an apparatus of the aforesaid kind it is proposed that the inner drum be made somewhat longer than the rotatable outer drum, and that the retaining apparatus be made up of a ring guided rotatably at the free end, projecting beyond the rotatable drum, of the stationary drum; and a coupling device, detachably fastened radially to the ring, that is arranged at the end of the directing device facing away from the pivot axis of the directing device. With this configuration the directing device retainer can be held positively and stably in all operating states in alignment with the inner drum, with no difficulties arising in pivoting back and forth. In a development of the invention, the ring can be guided on a guide surface of the stationary drum so as also to yield a certain axial displaceability. Axial expansion of the drums resulting from fluctuating temperatures can be compensated for in this manner. Skewing of the retainer and the directing device are reliably prevented.

In a development of the invention, the ring can also be provided on its inner diameter with rings, having a certain elasticity, lying against the stationary drum surface, so that it is also possible to compensate for any changes in radial diameter that may occur. The elastic rings also serve to retain the ring and the coupling device associated with it in a specific position on the stationary drum when the retaining arm and directing device are removed and pivoted aside, so that recoupling can occur immediately when the retaining arm is swung back.

It has proven to be advantageous if the coupling device consists of a taper associated with one of the two parts being coupled, and of a receptacle sleeve, associated with the other part, for the taper; such that taper and receptacle sleeve can be joined to one another by means of an axial threaded pin that engages in a part of a knurled nut and can be tightened by means thereof so that an immovable connection between the stationary drum and the retainer for the directing device is also ensured.

The directing device must change its position with respect to the outer rotatable drum to a certain extent depending on the product being manufactured. Since its rear end in the rotation direction is designed to ensure that material adhering to the outside of the drum is pressed back into the openings of the rotatable drum prior to the drop-forming point, the circumference of the rotatable drum uncovered by the directing device prior to the drop-forming point must also have a different size depending on the size of the tablet-like product being manufactured, which can be achieved by the fact that the directing device is pushed either toward the drop-forming point, i.e. toward the transport belt, or to the other side toward the upper half of the drums. In the known apparatuses (DE 41 19 021 C1) this has been achieved by the fact that the entire retainer for the directing device, along with the latter, has been guided by means of a disk-shaped ring in a recess of the fixed support frame and held there with clamping claws. Pivoting of the directing device has therefore always been associated with great complexity.

The present invention eliminates this disadvantage by the fact that the retaining arm is provided with guide plates for the directing device that are provided with a gated guide for the sliding parts joined to the directing device, the gated device corresponding to a circular arc segment whose center lies on the drum axis. With this embodiment the retaining arm itself no longer needs to be displaced out of its position in order to adjust the position of the directing device. It is sufficient to displace the directing device correspondingly with respect to the retaining arm, which because of the provision of the gated guide is extremely simple. Adjustment can occur, for example, by means of an adjustment spindle that runs between directing device and retaining arm and allows the desired displacement of the directing device in its gated guide.

In an advantageous embodiment the gated guide is configured as a web describing a quarter of a circle, on which a sliding element, joined to the directing device and at least partly surrounding the web, is guided. This sliding element can be additionally secured with respect to the gated guide by means of locking screws, once the desired adjustment by means of the adjustment spindle has occurred. This results in sufficient immobilization.

A further problem of known apparatuses of the aforesaid kind consists in the fact that depending on the product, the inner stationary drum also must be adjusted through a certain angle with respect to the transport belt prior to operation if proper drop-forming of the product is to be achieved. Until now, this has been achieved in the same way in which the directing device retainer had been adjusted. The rotoformer, cantilevered freely at one end and consisting of the stationary and the rotatable drum, had on its mounted end a bearing housing that was also secured to a support plate of the support frame in a specific position by means of claws. When an adjustment was necessary, the claws, i.e. the fixing means of the bearing housing, were released with respect to the frame in order to make the desired adjustment. This design entails the risk that if the rotary drive for the outer drum were inadvertently activated with the pivot mount in the released state, the inner, normally stationary drum would also rotate. Since the latter has the delivery hoses for the product and the heating medium and the like permanently connected to it on its bearing side, an action of this kind can create the risk that hoses may twist and be damaged or even destroyed, which can be dangerous if those hoses are filled with a pressurized medium at high temperature.

In an apparatus of the aforesaid kind with a stationary drum retained in a fixed support frame and angularly adjustable about its axis, the invention therefore proposes that angular adjustment of the stationary drum occur with the aid of a self-locking worm drive, the worm gear of which is associated with the drum, and the screw spindle of which with the fixed support frame. The screw spindle can be provided with a handwheel that is accessible from outside. With this feature it is possible to prevent undesired rotation of the inner drum even when the immobilization means of the inner drum is released for an adjustment operation, since its position remains secured by the worm drive and can only be changed by turning the handwheel.

BRIEF DESCRIPTION OF THE DRAWINGS

The invention is depicted in the drawings with reference to an exemplary embodiment and will be explained below. In the drawings:

FIG. 1 shows a schematic top view of an apparatus according to the invention, with a "rotoformer" and a swing-away directing device that is shown in the operating or retracted position and in a swung-away position;

FIG. 3 shows a section through the device of FIG. 1 along the line 3—3;

DETAILED DESCRIPTION OF A PREFERRED EMBODIMENT OF THE INVENTION

Figure 2:
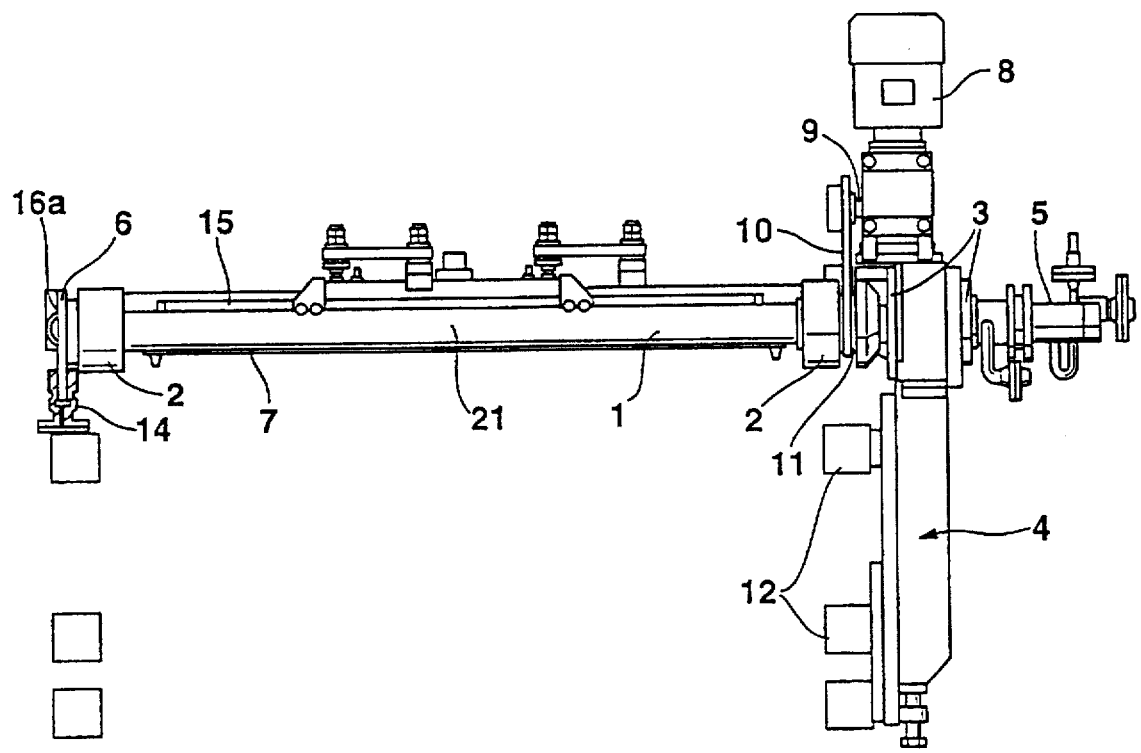
FIG. 2 shows a view of the rotoformer of FIG. 1 viewed in the direction of the arrow II of FIG. 1.

FIGS. 1 to 4 show an apparatus for drop-forming molten substances, operating according to the method known in practice under the name "ROTOFORM." This apparatus consists of two (1 and 16), guided concentrically inside one another, the outer (1) of which is provided on its entire circumference and over approximately the full length, in a manner not shown in detail, with openings. This outer tubular drum (1) possesses at both ends bearings (2) with which it is rotatably mounted on the inner cylindrical drum.

The inner drum (16) is mounted at its right-hand end, in largely cantilevered fashion, between two vertical plates (3, 3) of a support frame (4), and can be supplied via connections (5) known in the art with a molten substance for drop-forming and with a heating medium that provides temperature control for the apparatus. Provided at the free end visible in FIG. 1, but visible in FIG. 6 ), (16a) of the inner drum body (not visible), facing away from the bearing plates (3), is a ring (6) mounted on the (FIG. 6) cylindrical end (16a) of the inner drum that projects beyond the outer tube (1) and its bearing (2). The inner drum is of course, and in a known manner, closed at this free end. The material for drop-forming that is delivered to it through the connections (5) is discharged downward onto a transport or cooling belt (7) guided beneath the drum (1) by the fact that the openings provided in the drum (1), as they rotate, are brought into registration with a slit or a row of openings in the inner drum (16) that are directed toward the transport or cooling belt (7).

A drive motor (8) is provided in order to effect rotation of the outer drum (1); its drive shaft (9) drives, via a chain (10), a gear (11) fixedely joined to the drum (1).

Figure 4:
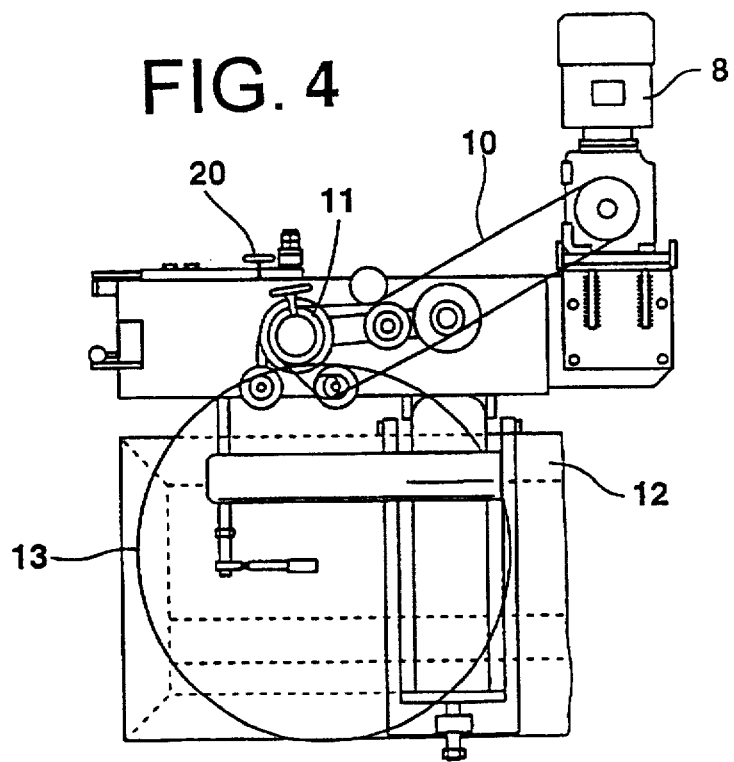
FIG. 4 shows a side view of the apparatus of FIG. 1, viewed in the direction of the arrow 4.

The support frame (4) is attached to a support frame (12) for the cooling belt, in which is also arranged a reversing drum (13), visible in FIG. 4, over which the transport or cooling belt (7) is guided. A bracing device (14) which in the exemplary embodiment is configured as a micrometer screw rests from below against the free end of the ring (6) arranged at the free end of the inner drum, which will be discussed later. With this arrangement the rotoformer also experiences adjustable bracing on the side facing away from its mounting on the plate (3), with which it is possible, especially when the transport or cooling belt (7) needs to be placed very close to the outer drum (1), to achieve a precise spacing between drum (1) and belt (7) over the entire belt width.

Figure 5:
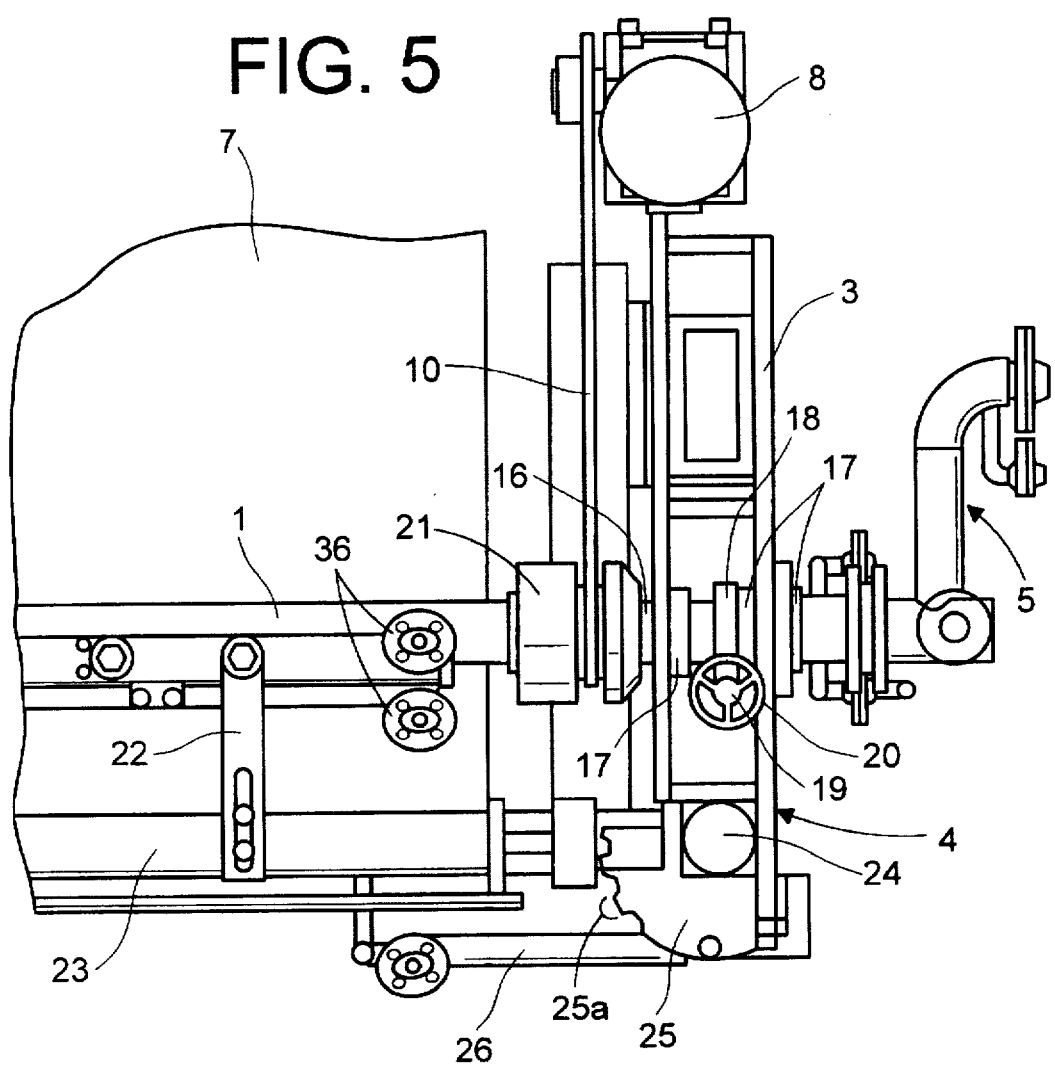
FIG. 5 shows an enlarged partial top view of the bearing of the apparatus of FIG. 1.

The inner drum is arranged to permit angular adjustment to a certain extent between the two plates (3). Such adjustment is necessary, for example, when transitioning from the manufacture of one product to another, and when for this purpose the drop-forming point for the molten substance needs to be changed somewhat with respect to the transport and cooling belt (7), for example adjusted slightly forward opposite the belt travel direction or backward in the belt travel direction with respect to a vertical plane running through the drum axis. This is achieved by the fact that the inner drum body (16), which is stationary during operation, is provided in the region between the two bearing plates (3), i.e. in the region between its two bearings (17), with a worm gear (18) that is fixedely joined to it and can be adjusted via a screw spindle (19) (shown only schematically in FIG. 5) by means of a handwheel (20). The worm drive is designed so that it is self-locking. Thus even when the locking apparatuses, provided for the inner drum body (16) once its position has been set, are released, unintentional rotation of the inner drum body (16) cannot occur if the drive (8) is activated for any reason. The self-locking feature of the worm drive retains the inner drum body (16) in its position. The risk that when the mount for the inner drum (16) is released, the latter along with its connections (5) and hose connections (not shown) might then rotate, therefore does not exist.

Lying against the outer drum (1) is a directing device (15) whose length corresponds approximately to the drop-forming width. This directing device, which is heated, serves to push back into the openings, prior to the drop-forming point, product residues adhering to the outer drum (1) that might interfere with the drop-forming process. However, since this directing device (15) must also allow access to the circumferential surface of the drum (1), for example for maintenance purposes, the directing device (15) is joined to a frame comprised of of support arms (22) connected to a pivot arm (23) to form an integral unit (60) that can be pivoted away from the circumference of the drum (1) about a pivot axis (24) running orthogonally to the axis (21) of the drums (1 and 16) and can be moved, for example, into a retracted position. In the retracted position shown in FIG. 1, the numerals designating the parts of the unit (60) in a retracted position are provided with a prime symbol. Associated with the pivot axis (24) and the mount for the pivot arm 23 is a snap-lock disc (25), in the shape of a quarter-circle, with three snap-lock recesses (25 A that interact with a snap lock (not shown further) on the pivot arm (23) and can lock it, for example, in the retracted position. Also joined to the pivot arm (23) is a damping cylinder (26) that is articulated onto the fixed snap-lock disk (24). This damping cylinder (26) is provided for safety reasons to prevent the pivot arm from traveling to the retracted position to rapidly, and, for example, doing injury to a person performing maintenance.

Figure 7:
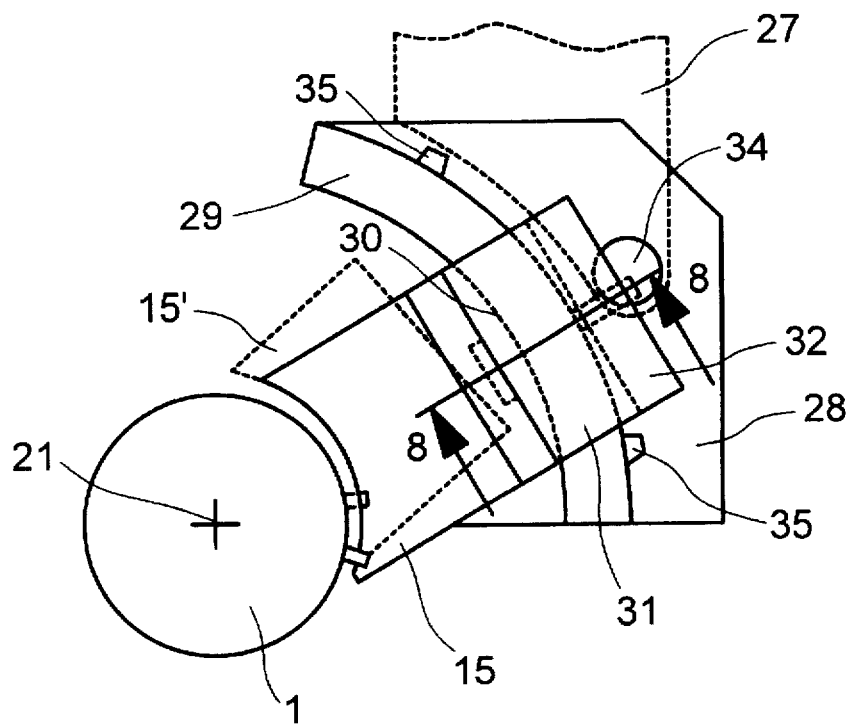
FIG. 7 shows an enlarged schematic depiction of the section along line 7—7 in FIG. 1.
Figure 8:
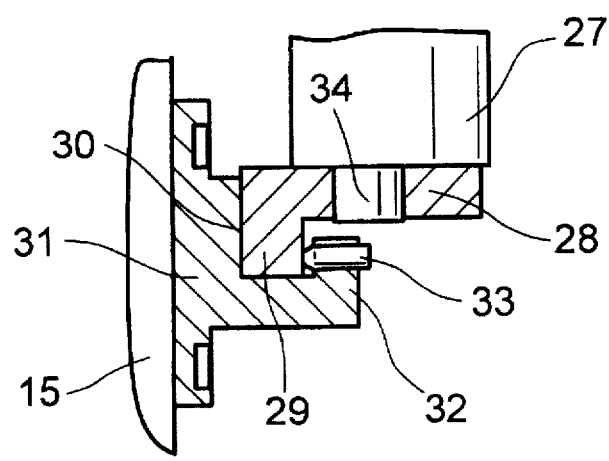
FIG. 8 shows a section along line 8—8 in FIG. 7.

Joined to the retaining arms (22) is a retainer (27) on which are fastened, as is evident from FIGS. 7 and 8, two guide plates (28) that are each provided with a web (29) in the form of a quarter-circle. This quarter-circle (29) has a center point that lies on the axis (21) of the drums (1, 16). The directing device sits on this quarter-circle with a retainer (31) that has a guide groove (30) matching the internal curvature of the web (29) and a guide edge (32), covering the web in a U-shape, in which a locking screw (33) is arranged. The directing device (15) can therefore be adjusted along the quarter-circle web (29) to a certain extent relative to the drum (1), with no need to adjust the pivot arm (23) for that purpose.

In the exemplary embodiment, the guide plates (28) are joined via bolts (34) to the retainer (27). Two stops (35) are associated with the quarter-circle web (29), so that rapid adjustment of the directing device (15) from the solid-line position depicted in FIG. 7 to the second position broken-line (15') can be performed very easily.

Figure 6:
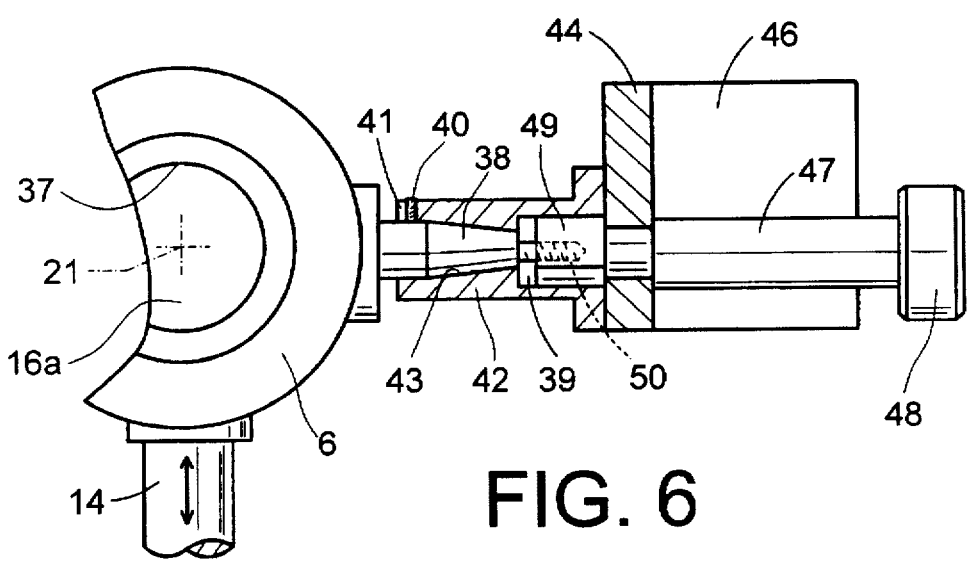
FIG. 6 shows an enlarged and partly cutaway partial view of the free end of the pivot retainer for the directing device.

In order to hold the retaining arm (23) and thus the directing device (15), which also has connections (36) for inflow and outflow of a heating medium, in a correctly aligned position with respect to the drum (1), the ring (6), which is provided on its inner circumference with an elastic ring (37) as indicated in FIG. 6, is slid—as already indicated above and shown in FIG. 6—onto the free end (16a) of the stationary drum which projects beyond the drum (1). The ring (6) sits on a cylindrical section (16a) of the stationary drum (16). It can therefore shift somewhat in the axial direction with respect to the stationary drum (16) if the latter should expand axially as a result of temperature changes.

The ring (6) is fixed to a projection in favor of a laterally projecting taper rod (38) that is provided at its free end with a threaded pin (39). A sleeve (42) is mounted on the rod (38). To prevent rotation of the sleeve (42) rotation, a set screw (40) a cylindrical part preceding the engages in the slit (41) of a sleeve (42). The sleeve has an internal recess with a tappered section (43) matching the taper of rod (38). The sleeve (42) is immovably joined to a support plate (44) that is in turn joined, via a spacer (45) and a flange (46) extending at right angles thereto, to the pivot arm (23). Rotatably mounted in the support plate (44) is a sleeve (47) that is provided at its free end with a knurled handwheel (48). The sleeve (47) has a head, projecting into a recess of the sleeve (42) preceding the tapered recess section (43), in which is arranged a threaded hole (50) whose threads correspond to the threads of the threaded pin (39). The connection between the pivot arm (23) and the free end (16a) of the drum (16) is therefore accomplished by means of the ring 6 and its taper rod (38) and by means of the sleeve (42). The precise fit provided by the taper rod (38) is secured by the threaded sleeve (49). After the threaded sleeve (49) is loosened by means of the knurled nut (48), the pivot arm (23) with the directing device (15) can be swung aside and locked, for example in the retracted position (see FIG. 1). The new configuration allows perfect alignment of the directing device with respect to the drum (1), while presenting no obstacles to any desired pivoting operation.

I claim:

1. An apparatus for applying strips or drops of a free-flowing substance onto a transport belt traveling therebeneath, comprising:

a stationary inner drum having at least one opening in its lower portion, the interior of the stationary drum communicating with a source of free-flowing substance;

an outer drum arranged coaxially around the inner drum and mounted for rotation relative to the inner drum about a common longitudinal axis of the inner and outer drums, the outer drum having a plurality of openings that become sequentially aligned with the at least one opening of the inner drum during rotation of the outer drum to allow free-flowing substance to fall through the aligned openings in the form of strips or drops;

at least a first end of the inner drum extending axially beyond a respective end of the outer drum;

a movable unit mounted adjacent the first and second drums and movable between operating and retracted positions with respect to the drums, the movable unit including:

a frame mounted for pivoting movement about an axis situated adjacent a second end of the inner drum situated opposite the first end thereof, and a directing device mounted on the frame and arranged to face a generally upwardly facing portion of the outer drum when the movable unit is in the operating position, for redirecting, into the openings of the outer drum, residual amounts of the free-flowing substance that have not dropped from the outer drum; and a retaining mechanism for securing the movable unit in the operating position comprising a ring mounted coaxially around an outer circumferential surface of the free end of the stationary drum, and first and second connecting elements mounted on the ring and movable unit, respectively and extending generally radially with respect to the common axis of the drums, the first and second connecting elements being interconnected when the movable unit is in the operating position.

2. The apparatus according to claim 1 wherein the first connecting element comprises a radial projection, and the second connecting element comprises a recess-forming structure for receiving the projection.

3. The apparatus according to claim 2 further comprises a releasable lock for securing the projection to the recess-forming structure.

4. The apparatus according to claim 3 wherein the projection includes a first screw-thread, the lock comprising a second screw-thread formed on a manually rotatable member and arranged to be threadedly connected to the first screw-thread.

5. The apparatus according to claim 4 wherein the first screw-thread is an external screw-thread, and the second screw-thread in an internal screw thread.

6. The apparatus according to claim 4 wherein the projection includes a tapered portion disposed between the first screw thread and the ring, the recess including a tapered portion for receiving the tapered portion of the projection.

7. The apparatus according to claim 2 wherein the projection includes a tapered portion, and the recess includes a tapered portion for receiving the tapered portion of the projection.

8. The apparatus according to claim 1 wherein the ring is rotatably adjustable relative to the stationary drum.

9. The apparatus according to claim 8 wherein the ring is axially adjustable relative to the stationary drum.

10. The apparatus according to claim 1 wherein the ring is axially adjustable relative to the stationary drum.

11. The apparatus according to claim 1 further including an elastic element radially interposed between the stationary drum and the ring.

12. The apparatus according to claim 1 wherein the frame includes guide plates to which the directing device is adjustably mounted for movement relative thereto about the common axis of the drums.

13. The apparatus according to claim 12 wherein each guide plate form a guide web in the form of a quarter-circle, the directing device including a sliding element slidable along the web; and further including a clamp for clamping the sliding element to the web in adjusted positions.

14. The apparatus according to claim 1 including a support in which the second end of the stationary drum is mounted for adjustable rotation about the common axis of the drums, a worm gear affixed to the second end, and a rotatable screw spindle mounted on the housing and engaging the worm gear for adjustably rotating the stationary drum, the worm gear and screw spindle defining a self-locking worm device.

15. The apparatus according to claim 14 including a manually rotatable hand wheel affixed to the screw spindle.

* * * * *